(12) United States Patent
Isoda et al.

(10) Patent No.: US 8,188,626 B2
(45) Date of Patent: May 29, 2012

(54) CONTROLLER-INTEGRATED ELECTRIC ROTATING MACHINE

(75) Inventors: Hitoshi Isoda, Tokyo (JP); Masahiko Fujita, Tokyo (JP); Atsushi Takechi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 260 days.

(21) Appl. No.: 12/722,254

(22) Filed: Mar. 11, 2010

(65) Prior Publication Data

US 2011/0101804 A1 May 5, 2011

(30) Foreign Application Priority Data

Nov. 2, 2009 (JP) ................. 2009-252007

(51) Int. Cl.
*H02K 1/32* (2006.01)

(52) U.S. Cl. .......................... 310/64; 310/71

(58) Field of Classification Search .................. 310/64, 310/71
See application file for complete search history.

(56) References Cited

U.S. PATENT DOCUMENTS

| 5,814,909 | A * | 9/1998 | Yamada et al. | 310/64 |
| 7,411,324 | B2 * | 8/2008 | Kusumi | 310/68 D |
| 7,414,339 | B2 * | 8/2008 | Kitamura et al. | 310/68 D |
| 2005/0258690 | A1 * | 11/2005 | Kusumi | 310/68 D |
| 2006/0087181 | A1 * | 4/2006 | Kusumi | 310/68 D |
| 2006/0138883 | A1 * | 6/2006 | Yagai et al. | 310/71 |
| 2010/0289351 | A1 * | 11/2010 | Maeda et al. | 310/64 |

FOREIGN PATENT DOCUMENTS

WO   2006/129031 A1   12/2006

* cited by examiner

*Primary Examiner* — Thanh Lam
(74) *Attorney, Agent, or Firm* — Sughrue Mion, PLLC (57) ABSTRACT

There is obtained a controller-integrated electric rotating machine that is superior in terms of a cooling effect.
In a controller-integrated electric rotating machine provided with a stator 3 configured with an iron core 3B and a stator winding 3A, a rotor 4 having a cooling fan 5, an inverter power circuit 20 that is a control apparatus for applying a stator current to the stator winding 3A, and a bus bar 30 that supplies the inverter power circuit 20 with electric power from a battery, the inverter power circuit 20 includes a power module 21 that has a function of switching the stator current, a heat sink 23 on which the power module 21 is mounted by the intermediary of an insulating layer, and an insulator case 25 that incorporates the power module 21 and holds respective terminals of the power module 21; and the bus bar 30 is connected with terminals 22*a*, 22*b*, 22*c*, and 22*d* of the inverter power circuit 20 and has a cooling fin 30*a*.

8 Claims, 8 Drawing Sheets

CONTROLLER-INTEGRATED ELECTRIC ROTATING MACHINE

BACKGROUND OF THE INVENTION

1. Field of the Invention

The present invention relates to a controller-integrated electric rotating machine mounted, for example, on a vehicle, and particularly to the cooling structure of an inverter power circuit utilized as a control apparatus for a controller-integrated electric rotating machine.

2. Description of the Related Art

In "an electric-power mutually connecting component for an electric rotating machine" disclosed in National Publication of International Patent Application No. 2008-543261, there is described the configuration of a vehicle power-generation motor for supplying a vehicle with electric power and for driving the engine of the vehicle. In the foregoing Patent Document, there is described the configuration of an electric-power mutually connecting component for inputting electric power to and outputting electric power from an inverter power circuit mounted on an electric rotating machine.

In such a vehicle power-generation motor as disclosed in National Publication of International Patent Application No. 2008-543261, there has been a problem that an electric current flowing in an electric-power mutually connecting component generates heat; this heat transferred to a stator power module due to thermal transfer; and the temperature rise in the stator power module is enlarged.

SUMMARY OF THE INVENTION

In order to solve the foregoing problem, the present invention proposes a controller-integrated electric rotating machine in which a member for inputting electric power from a battery terminal to an inverter power circuit and for outputting electric power from the inverter power circuit to the battery terminal is configured, as a bus bar, with a heat sink for cooling a power module and with other components, and the bus bar is made fin-shaped so that the temperature rise in the power module mounted on the heat sink is reduced.

A controller-integrated electric rotating machine according to the present invention includes a stator configured with an iron core supported by a bracket and a stator winding, a rotor having a cooling fan, an inverter power circuit that is a control apparatus for applying a stator current to the stator winding, and a bus bar that supplies the inverter power circuit with electric power from a battery; the inverter power circuit includes a power module that has a function of switching the stator current, a heat sink on which the power module is mounted by the intermediary of an insulating layer, and an insulator case that incorporates the power module and holds respective terminals of the power module; the bus bar is connected with terminals of the inverter power circuit and has a cooling fin.

In a controller-integrated electric rotating machine according to the present invention, the power module of an inverter power circuit, which is a control apparatus, is cooled by means of a heat sink on which the power module is mounted, and a fin is formed also on a bus bar, which is a current input/output circuit for the inverter power circuit, so that the coolability of the bus bar per se is raised; therefore, heat generated in the power module can be radiated also from the bus bar, by way of terminals, of the power module, which are electrically connected with the power module. As a result, the temperature rise of the power module can be reduced.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

In FIGS. 1 through 7, a controller-integrated electric rotating machine according to Embodiment 1 is provided with a stator 3 supported by a bracket configured with a front bracket 1 and a rear bracket 2 that are integrally combined with each other. The stator 3 is configured with a stator iron core 3B and a stator winding 3A wound around the stator iron core 3B. A rotor 4 is provided in such a way as to face the inner circumference of the stator 3. The rotor 4 has a magnetic-field winding 7 and rotates in such a way as to be fixed on a shaft 6 supported by a bearing provided in the front bracket 1 and a bearing provided in the rear bracket 2. On the rotor 4, there is mounted a cooling fan 5 for cooling the inside of the electric rotating machine with air.

Figure 1:
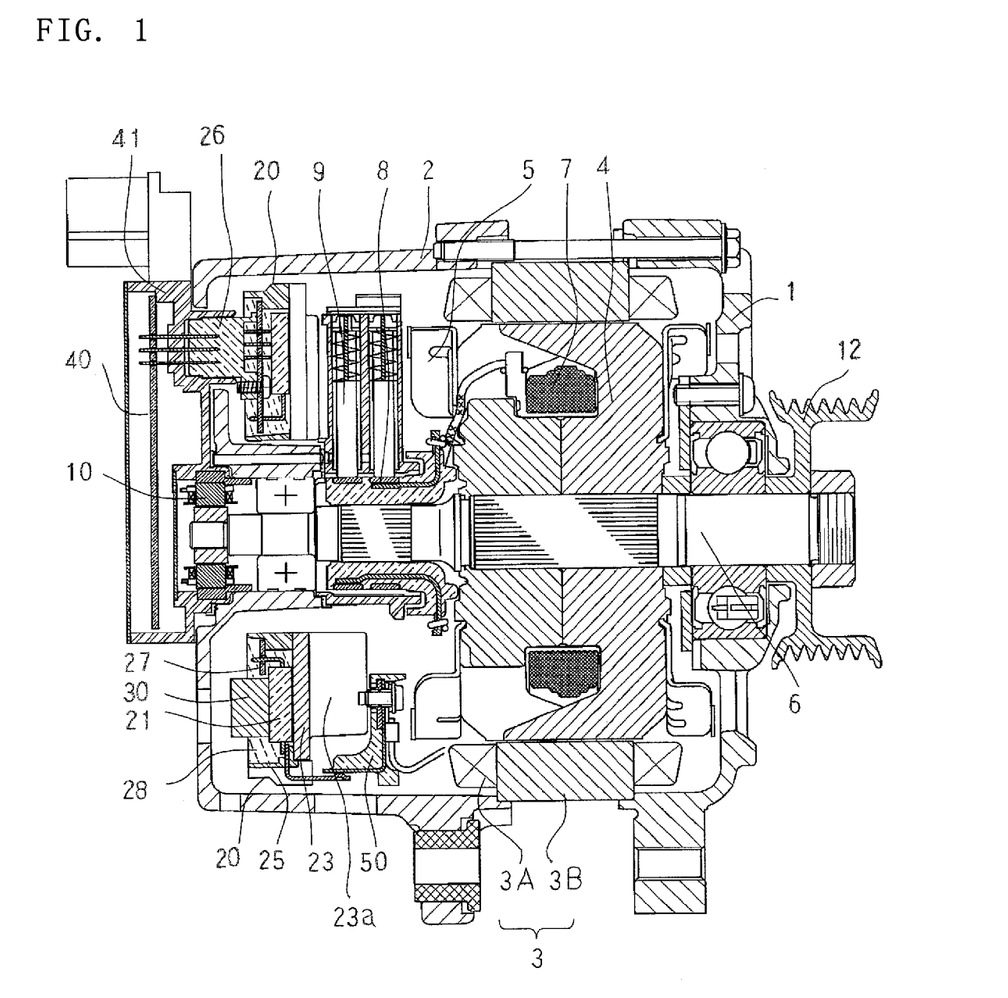
FIG. 1 is a cross-sectional view illustrating a controller-integrated electric rotating machine according to Embodiment 1 of the present invention.

This controller-integrated electric rotating machine has an inverter power circuit 20 and a bus bar 30 that is electrically and mechanically joined with the inverter power circuit 20 and formed of a metal material. The detail of the relationship between the inverter power circuit 20 and the bus bar 30 will be described later with reference to FIGS. 2 and 3. The inverter power circuit 20 is to supply AC electric power to the stator winding 3A; the bus bar 30 is to input electric power from a battery terminal 11 (refer to FIG. 3) of the electric rotating machine to the inverter power circuit 20 and to output electric power from the inverter power circuit 20 to the battery terminal 11. The inverter power circuit 20 and the bus bar 30 are incorporated in the rear bracket 2 and arranged closer to the rear side of the electric rotating machine than the stator 3 and the rotor 4. The inverter power circuit 20 is held by and fixed to the rear bracket 2. Behind the rear bracket 2, a resin case 41 on which a control circuit board 40 for controlling the inverter power circuit 20 is held by and fixed on the rear bracket 2.

A slip ring 8 is provided on the shaft 6; a brush 9 slidably makes contact with the slip ring 8, so that a current is supplied to the magnetic-field winding 7. A pulley 12 is mounted at the front end of the shaft 6; a magnetic pole position detection sensor 10 is mounted at the rear end of the shaft 6. The inverter power circuit 20 is connected with the control circuit board 40 by way of a signal line output member 26.

Figure 2:
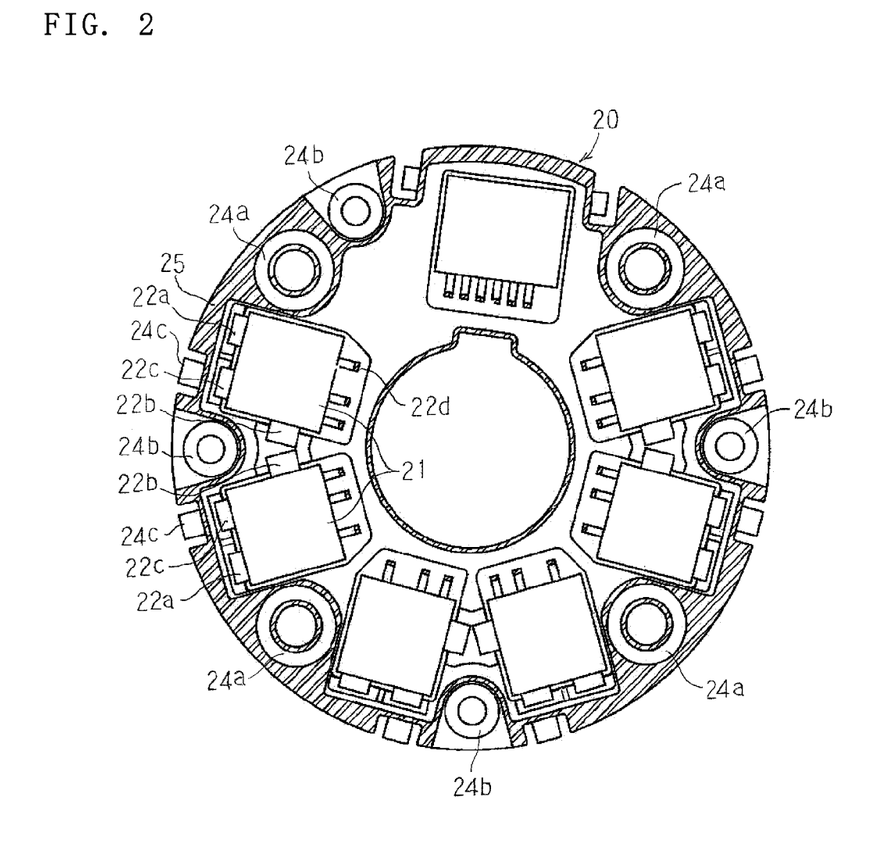
FIG. 2 is an elevation view of an incomplete inverter power circuit according to Embodiment 1 when viewed from the backside thereof.
Figure 3:
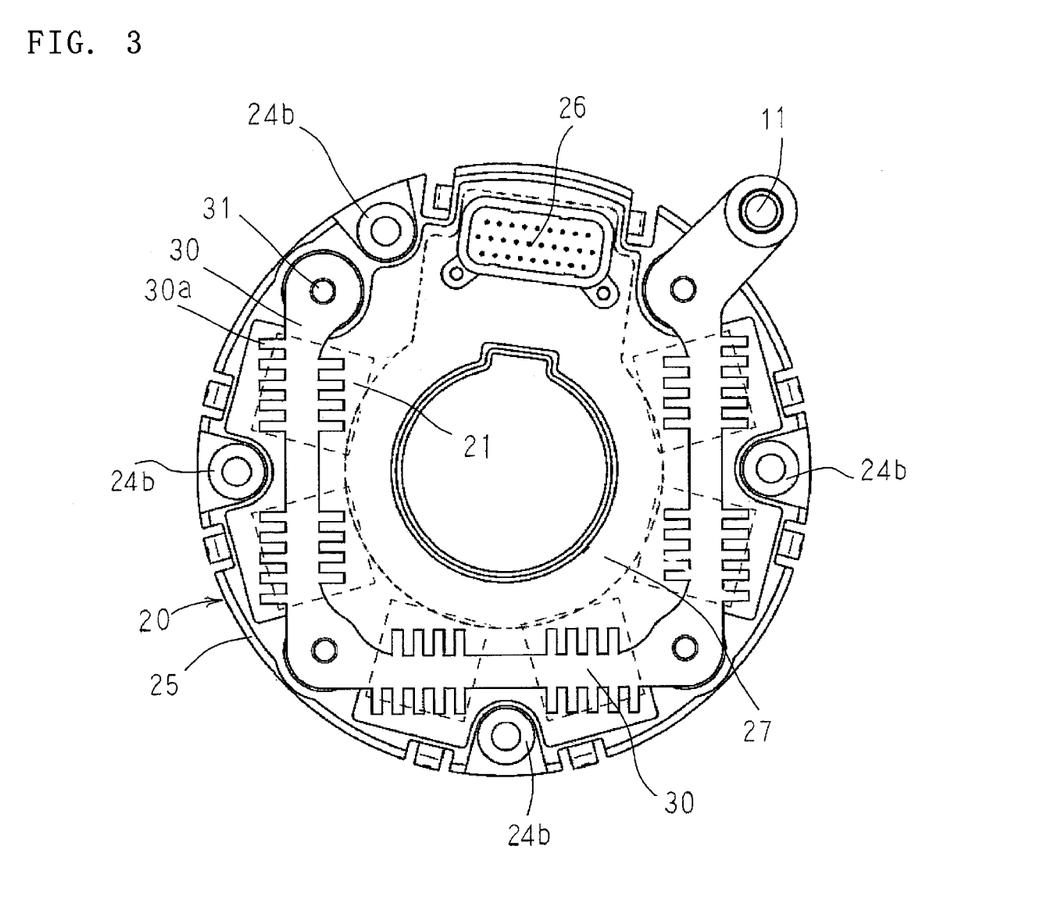
FIG. 3 is an elevation view of a complete inverter power circuit, on which a bus bar is mounted, according to Embodiment 1 when viewed from the backside thereof.

Next, the inverter power circuit 20 will be described in detail. FIG. 2 is a front-side cross-sectional view illustrating a state where no relay board has been mounted on the inverter power circuit 20 and no waterproof resin has been filled into the inverter power circuit 20. FIG. 3 is an elevation view illustrating a state where, after a relay board had been mounted on the inverter power circuit 20 and a waterproof resin had been filled into the inverter power circuit 20, the bus bar 30 has been mounted.

In FIGS. 1 through 7, the inverter power circuit 20 is provided with a resin case 25, a roughly donut-shaped heat sink 23 that covers one side of the resin case 25, and a plurality of power modules (in FIG. 3, six power modules) 21 that is mounted on the heat sink 23 by the intermediary of an insulating layer (unillustrated) in a space defined by the resin case 25 and the heat sink 23.

The heat sink 23 has a cooling fin 23a at a position opposite to the power module 21. The power module 21 has a terminal 22a connected with the potential of the battery, a terminal 22b connected with the ground potential, a terminal 22c for the electrical connection with the stator winding, and a signal line terminal 22d of the power module. The resin case 25 has a terminal 24a connected with the potential of the battery, a terminal 24b connected with the ground potential, and a terminal 24c for the electrical connection with the stator winding. The terminal 24a and the terminal 22a are connected with each other through soldering; the terminal 24b and the terminal 22b are connected with each other through soldering; the terminal 24c and the terminal 22c are connected with each other through soldering. The power module 21 is disposed in a space defined by the heat sink 23 and the resin case 25; because this space is filled with the waterproof resin 28, the power module 21 is embedded in the waterproof resin 28.

Figure 5:
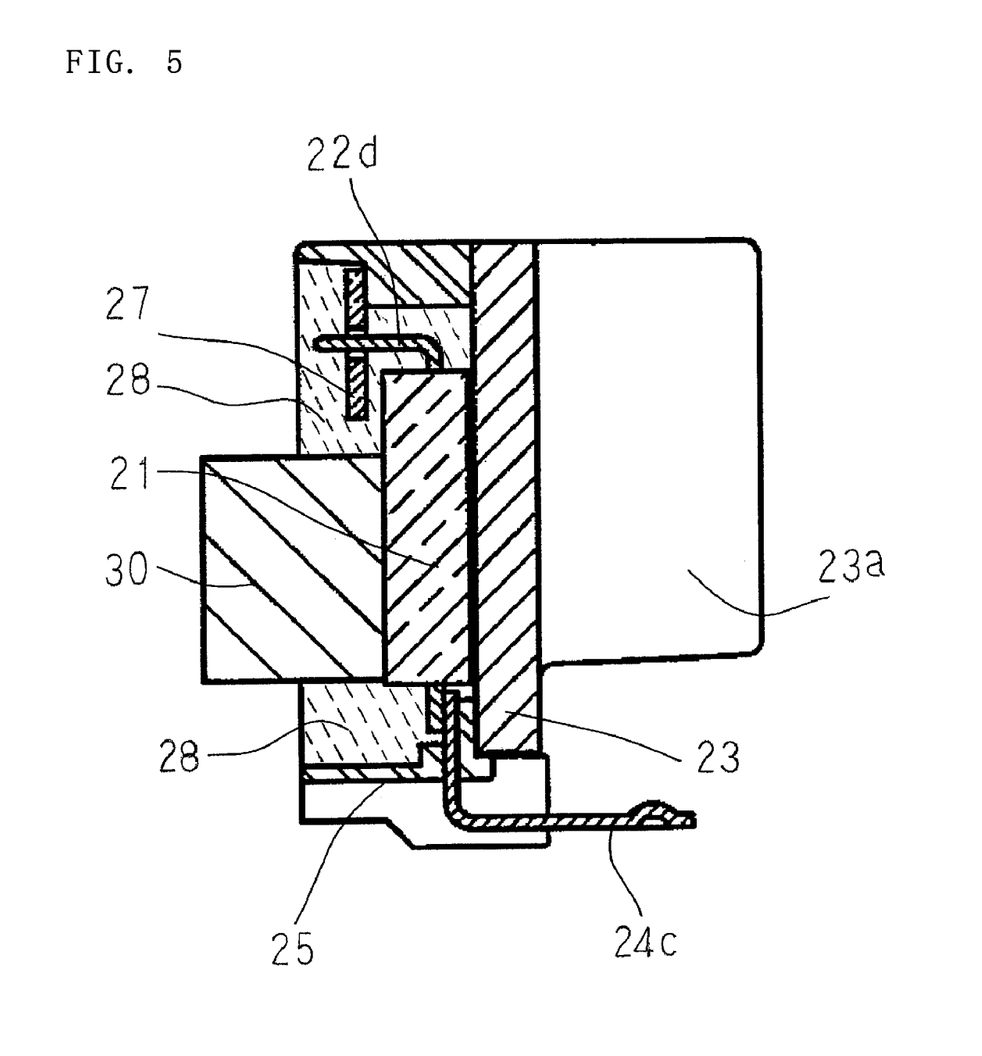
FIG. 5 is a partially enlarged cross-sectional view illustrating the positional relationship between a power module and a bus bar according to Embodiment 1.
Figure 6:
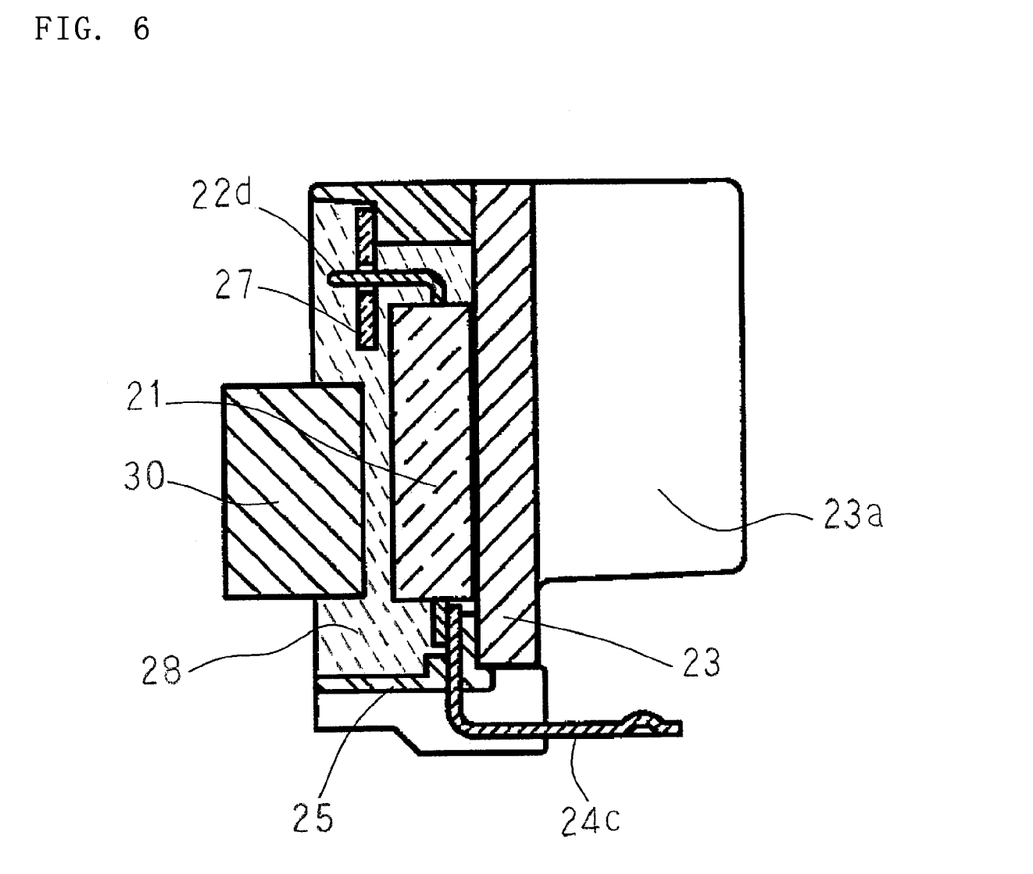
FIG. 6 is a partially enlarged cross-sectional view illustrating another positional relationship between a power module and a bus bar according to Embodiment 1.

As illustrated in FIG. 3, on the inverter power circuit 20, there are assembled the bus bar 30, which is roughly U-shaped, and a signal line connecting relaying terminal board 27. The bus bar 30 has the battery terminal 11 connected with the battery of the electric rotating machine, and cooling fins 30a are provided on the respective sides of the U shape. The bus bar 30 and the power module 21 are arranged in such a way that they are approximately superimposed on each other; as illustrated in FIG. 5, they are in contact, or as illustrated in FIG. 6, they are arranged in such a way as to be separated from each other. Approximately bottom half, of the bus bar 30, at the power module 21 side thereof, is embedded in the waterproof resin 28; however, the cooling fin 30a is provided at a position that is usually not embedded in the waterproof resin 28.

Figure 4:
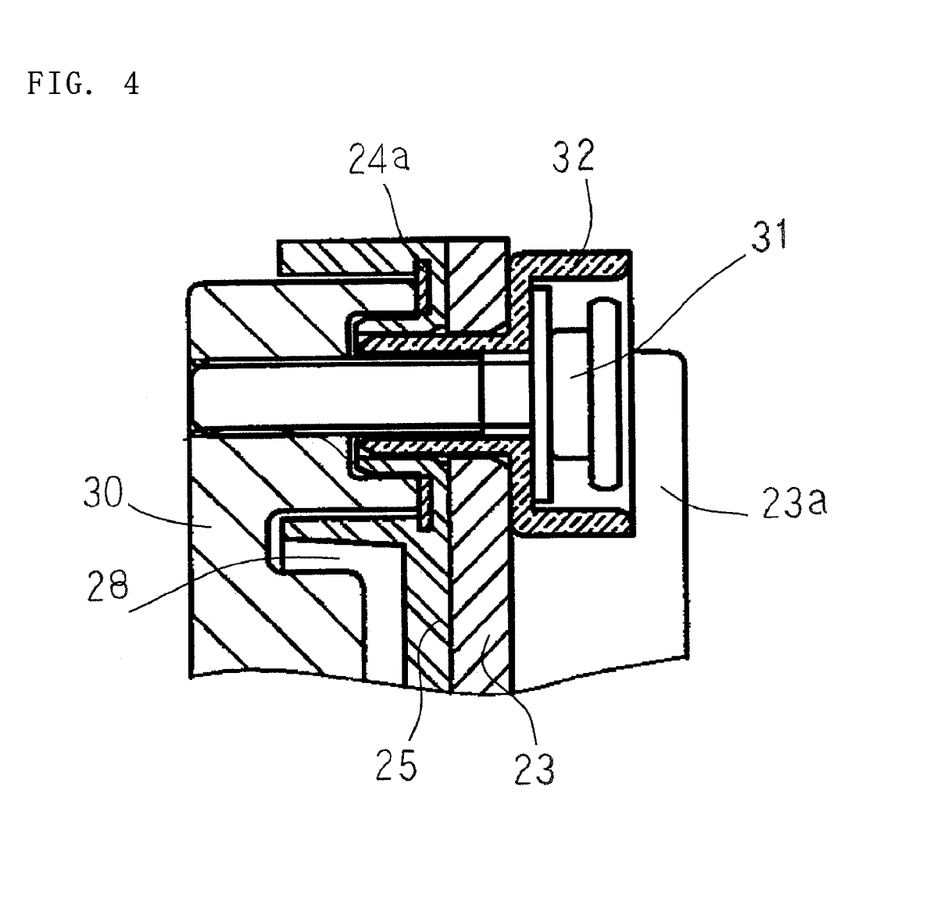
FIG. 4 is a partially enlarged cross-sectional view illustrating the structure for connecting an inverter power circuit with a bus bar according to Embodiment 1.

Both ends and both corners of the U shape of the bus bar are connected with the respective terminals 24a that are connected with the battery potential. As illustrated in FIG. 4, the bus bar 30 is connected, by use of a bolt 31, with a terminal 24a, of the resin case 25, connected with the battery potential. In this situation, an insulating member 32 is inserted between the heat sink 23 and the bolt 31 so that the potential of the heat sink 23 does not become equal to the battery potential.

The bus bar 30, which inputs electric power from the battery terminal 11 of the electric rotating machine to the inverter power circuit 20 and outputs electric power from the inverter power circuit 20 to the battery terminal 11, is disposed at a position opposite to the heat sink 23 with respect to the power module 21; as described above, the fin 23a of the heat sink 23 extends to the side opposite to the power module 21.

The power module 21 has the terminal 22a connected with the potential of the battery, the terminal 22b connected with the ground potential, the terminal 22c for the electrical connection with the stator winding, and the signal line terminal 22d of the power module. The terminal 24a and the terminal 22a are connected with each other through soldering; the terminal 24b and the terminal 22b are connected with each other through soldering; the terminal 24c and the terminal 22c are connected with each other through soldering. These members provide electrical connection and configure a heat radiation path.

The inverter power circuit 20 is fixed to the rear bracket 2 with a bolt (unillustrated) so that the terminal 24a connected with the ground potential of the case 25 and the rear bracket 2 are connected with each other.

The signal line terminal 22d of the power module 21 is connected with the signal line connecting relaying terminal board 27 so as to be collected into the signal line output member 26, and is connected with the control circuit board 40, mounted behind the rear bracket 2, for controlling the switching operation of the power module 21. In this situation, the signal line connecting relaying terminal board 27 is embedded in the waterproof resin 28 in the U-shaped bus bar 30 in such a way as to be situated on approximately the same plane as the bus bar 30. By arranging the bus bar 30 and the signal line connecting relaying terminal board 27 on approximately the same plane, it is not required to elongate the electric rotating machine in the axis direction, whereby the electric rotating machine can be downsized.

As described above, the power module 21 is cooled by means of the heat sink 23. In contrast, because the bus bar 30 has the cooling fin 30a, the temperature of the bus bar 30 can be prevented from rising. Heat generated in the power module 21 is transferred to the bus bar 30 by way of the terminal 22a and the terminal 24a and then radiated from the bus bar 30. Furthermore, as illustrated in FIG. 5, in the case where the bus bar 30 makes contact with the power module in the waterproof resin 28, the power module 21 is also cooled directly by the bus bar 30, whereby the temperature increase of the power module 21 is further reduced.

As illustrated in FIG. 6, even in the case where the bus bar 30 does not make contact with the power module 21, the bus bar 30, along with the power module 21, is embedded in the waterproof resin 28; therefore, heat generated in the power module 21 is transferred to the bus bar 30 through the waterproof resin 28 and then radiated from the bus bar 30, so that there is demonstrated a certain effect of suppressing the temperature increase of the power module 21.

Figure 7:
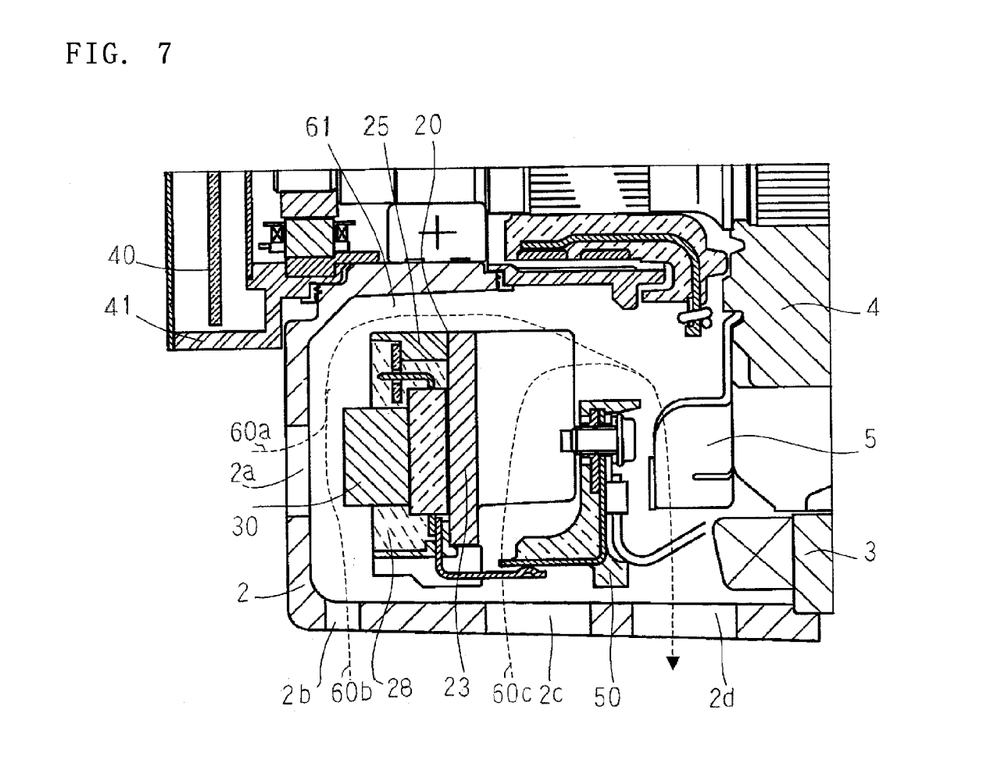
FIG. 7 is a partially enlarged cross-sectional view illustrating a ventilation path around a bus bar according to Embodiment 1.

FIG. 7 is an enlarged longitudinal cross-sectional view illustrating part of the periphery of the inverter power circuit 20. In the rear bracket 2, air inlets 2a, 2b, and 2c and an air outlet 2d are formed. The air inlet 2a is situated behind the bus bar 30; the air inlet 2b is situated in the vicinity of the outer circumference of the bus bar 30; the air inlet 2c is situated in the vicinity of the heat sink 23. An air ventilation path 61 is formed between the inner circumference of the inverter power circuit 21 and the rear bracket 2.

Due to rotation of the rotor 4, cooling air is produced by the fan 5; cooling air 60a taken in through the air inlet 2a and cooling air 60b taken in through the air inlet 2b pass by the bus bar 30 and then pass through the air ventilation path 61; meanwhile, the bus bar 30 is cooled. Cooling air 60c taken in through the air inlet 2c passes along the heat sink 23, so that the heat sink 23 is cooled. The cooling air 60a, 60b and 60c are discharged to the outside the electric rotating machine through the air outlet 2d of the rear bracket 2.

As described above, in the rear bracket 2, there are formed the air inlets 2a and 2b behind the bus bar 30 or in the vicinity of the outer circumference of the bus bar 30, and the air ventilation path 61 is formed in the vicinity of the inner circumference of the inverter power circuit 20, so that cooling air passes by the bus bar 30; thus, the bus bar 30 is further cooled, whereby the temperature increase of the power module 21 can further be reduced.

As described above, by reducing the temperature increase of the power module 21, the lifetime of a product can be prolonged.

Embodiment 2

Figure 8:
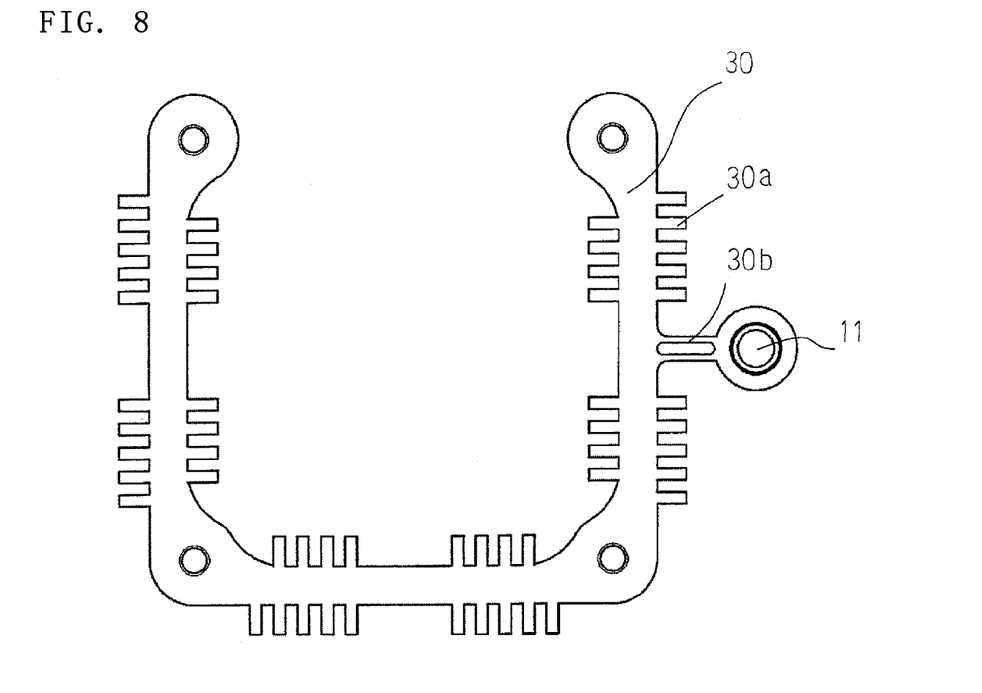
FIG. 8 is an elevation view illustrating a bus bar utilized in a controller-integrated electric rotating machine according to Embodiment 2 of the present invention.

FIG. 8 illustrates a bus bar of an electric rotating machine according to Embodiment 2 of the present invention. In Embodiment 2, a conductive communication portion 30b between the battery terminal 11 of the bus bar 30 and the bus bar 30 is configured in such a way that the cross-sectional area thereof is smaller than the cross-sectional area of any other portion of the bus bar 30, so that the conductive communication portion 30b has a function as a fuse.

In the case where a switching element of the power module 21 fails to be short-circuited, the portion between the battery terminal 11, which has the battery potential, and the bracket 2, which has the ground potential, is short-circuited, whereby a large current flows therein, and it is worried that the electric rotating machine may catch fire; however, by making the bus bar 30 also have a function as a fuse, the bus bar 30 is disconnected from the power source at the communication portion 30b of the bus bar 30 in the case where a large current flows; therefore, the electric rotating machine can be prevented from catching fire.

Various modifications and alterations of this invention will be apparent to those skilled in the art without departing from the scope and spirit of this invention, and it should be understood that this is not limited to the illustrative embodiments set forth herein.

What is claimed is:

1. A controller-integrated electric rotating machine comprising:
    a stator configured with an iron core supported by a bracket and a stator winding;
    a rotor having a cooling fan;
    an inverter power circuit that is a control apparatus for applying a stator current to the stator winding; and
    a bus bar that supplies the inverter power circuit with electric power from a battery,
    wherein the inverter power circuit includes a power module that has a function of switching the stator current, a heat sink on which the power module is mounted by the intermediary of an insulating layer, and an insulator case that incorporates the power module and holds respective terminals of the power module; and the bus bar is connected with terminals of the inverter power circuit and has a cooling fin.

2. The controller-integrated electric rotating machine according to claim 1, wherein the power module is embedded in a waterproof resin in a space between the insulator case and the heat sink.

3. The controller-integrated electric rotating machine according to claim 2, wherein the bus bar is disposed at a position that is opposite to the heat sink with respect to the power module and is approximately superimposed on the power module in an axis direction, and the side, of the bus bar, which faces the power module is embedded in the waterproof resin.

4. The controller-integrated electric rotating machine according to claim 3, wherein the portion, of the bus bar, which is embedded in the waterproof resin makes contact with the power module.

5. The controller-integrated electric rotating machine according to claim 2, wherein a signal line connecting relaying terminal board for connecting the power module with a control circuit is provided in the waterproof resin in such a way as to be embedded therein.

6. The controller-integrated electric rotating machine according to claim 5, wherein the signal line connecting relaying terminal board is disposed on approximately the same plane as the bus bar.

7. The controller-integrated electric rotating machine according to claim 1, wherein, in the bracket, an air inlet is provided in the vicinity of the outer circumference of the bus bar or behind the bus bar, and an air ventilation path that passes by the bus bar is formed.

8. The controller-integrated electric rotating machine according to claim 1, wherein the cross-sectional area of a communication portion for applying an electric current from the battery to the bus bar is smaller than the cross-sectional area of the bus bar.

* * * * *